(12) United States Patent
Flottran et al.

(10) Patent No.: US 11,755,011 B2
(45) Date of Patent: Sep. 12, 2023

(54) METHOD FOR CONTROLLING AN INDUSTRIAL TRUCK AS WELL AS A SYSTEM COMPRISING A SUPERORDINATE CONTROL UNIT AND AN INDUSTRIAL TRUCK

(71) Applicant: Jungheinrich Aktiengesellschaft, Hamburg (DE)

(72) Inventors: Dennis Flottran, Breitenfelde (DE); Hinrich Meyer, Barnstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 29 days.

(21) Appl. No.: 16/247,905

(22) Filed: Jan. 15, 2019

(65) Prior Publication Data
US 2019/0220005 A1    Jul. 18, 2019

(30) Foreign Application Priority Data
Jan. 15, 2018  (DE) ..................... 10 2018 100 758.2

(51) Int. Cl.
*G05D 1/00* (2006.01)
*B66F 9/075* (2006.01)
(Continued)

(52) U.S. Cl.
CPC .......... *G05D 1/0055* (2013.01); *B60W 30/09* (2013.01); *B62D 53/00* (2013.01); *B66F 9/0755* (2013.01);
(Continued)

(58) Field of Classification Search
CPC .............. G05D 1/0055; G05D 1/0276; G05D 2201/0216; B60W 30/09; B62D 53/00; B66F 9/0755; B66F 17/003
See application file for complete search history.

(56) References Cited

U.S. PATENT DOCUMENTS

| 7,124,027 | B1 * | 10/2006 | Ernst, Jr. ............... G01S 13/931 701/301 |
| 2007/0107966 | A1 * | 5/2007 | Brunner .................. G01S 17/42 180/167 |

(Continued)

FOREIGN PATENT DOCUMENTS

| DE | 4433786 A1 | 3/1996 |
| DE | 10146465 A1 | 4/2003 |

(Continued)

OTHER PUBLICATIONS

Translated Document of foreign application WO-2006054678-A1.*

*Primary Examiner* — Rami Khatib
*Assistant Examiner* — Shahira Baajour
(74) *Attorney, Agent, or Firm* — Barclay Damon LLP

(57) ABSTRACT

A method for controlling at least one industrial truck comprising determining a driving job using a superordinate control unit and sending the driving job from the superordinate control unit to a transceiver of the at least one industrial truck. The driving job is transmitted from the transceiver to a vehicle controller. A position of the at least one industrial truck within a previously known route to be driven is determined via the superordinate control unit. An upcoming driving situation is identified using the superordinate control unit and is based on the position of the at least one industrial truck and the driving job. A protective field is generated with a collision protection apparatus, wherein the protective field is monitored by the at least one industrial truck based on the upcoming driving situation even before the at least one industrial truck reaches the driving situation.

12 Claims, 2 Drawing Sheets

(51) Int. Cl.
  *B66F 17/00* (2006.01)
  *B60W 30/09* (2012.01)
  *B62D 53/00* (2006.01)
  *G05D 1/02* (2020.01)

(52) U.S. Cl.
  CPC ......... *B66F 17/003* (2013.01); *G05D 1/0276* (2013.01); *G05D 2201/0216* (2013.01)

(56) References Cited

U.S. PATENT DOCUMENTS

| | | |
|---|---|---|
| 2011/0093134 A1 | 4/2011 | Emanuel et al. |
| 2015/0170498 A1* | 6/2015 | Beggs .................... B60Q 9/008 340/686.6 |
| 2016/0342850 A1* | 11/2016 | Elimalech ................. B60R 1/00 |
| 2016/0350701 A1* | 12/2016 | Brehm ................. G05D 1/0297 |

FOREIGN PATENT DOCUMENTS

| | | | | |
|---|---|---|---|---|
| DE | 102010028911 A1 | 11/2011 | | |
| DE | 102015111613 A1 | 1/2017 | | |
| DE | 102015224309 A1 | 6/2017 | | |
| EP | 2722687 A1 | 4/2014 | | |
| EP | 3035074 A1 * | 6/2016 | .......... | G01S 5/0294 |
| EP | 3035074 A1 | 6/2016 | | |
| WO | WO-2006054678 A1 * | 5/2006 | ........... | B66F 17/003 |

\* cited by examiner

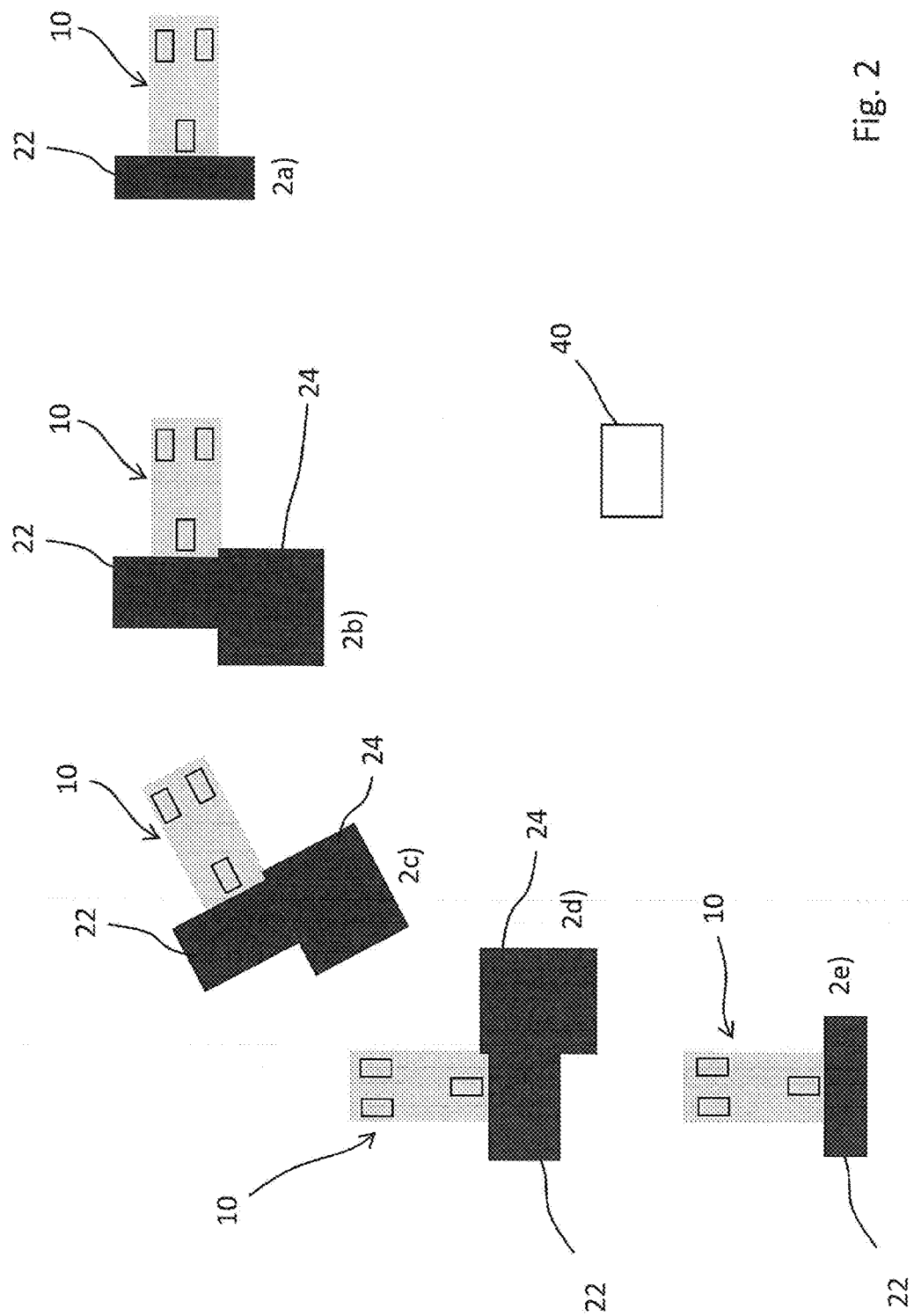

METHOD FOR CONTROLLING AN INDUSTRIAL TRUCK AS WELL AS A SYSTEM COMPRISING A SUPERORDINATE CONTROL UNIT AND AN INDUSTRIAL TRUCK

CROSS REFERENCE TO RELATED INVENTION

This application is based upon and claims priority to, under relevant sections of 35 U.S.C. § 119, German Patent Application No. 10 2018 100 758.2, filed Jan. 15, 2018, the entire contents of which are hereby incorporated by reference.

BACKGROUND

The invention relates to a method for controlling an industrial truck as well as a system comprising a superordinate control unit and an industrial truck.

Industrial trucks for transporting loads are used for example in warehouse or production halls. The industrial truck is surrounded at least partially with one or more protective fields in particular in autonomously or automatically driving industrial trucks. These protective fields are generated by sensors attached to the industrial truck and cover flat areas for example in the driving direction in front of the industrial truck. Upon entry of an unknown object, for example a person or an object, into the protective field, the industrial truck is stopped or slowed at first. The protective shield thus serves to protect from collisions.

These protective fields should be adjusted for the respectively present driving situation of the industrial truck in order to achieve a highest possible operating safety. Thus, for example, when the industrial truck is driving in a curve, the protective field can be positioned according to the changed driving direction depending on the steering angle adopted by the industrial truck. The protective field can also extend different distances in the driving direction of the industrial truck depending on the speed of the industrial truck. The current steering angle or respectively the current speed of the industrial truck can hereby be determined via sensors provided on the industrial truck. However, dangerous situations can continue to happen in particular in the case of high speed or tight curves.

A system made up of a superordinate control unit and several industrial trucks is known from US 2011 009 31 34 A1, which is incorporated by reference. A warehouse management system hereby determines the trajectories of the industrial trucks based on their position driving in the warehouse and determines from this possible areas of intersection in order to prevent collisions.

BRIEF SUMMARY OF THE INVENTION

The object of the invention is to provide a method for controlling an industrial truck or respectively a system made up of a superordinate control unit and at least one industrial truck, which ensures better collision protection.

A method for controlling at least one industrial truck comprises, in an embodiment, determining the position of the industrial truck within a previously known route to be driven by the industrial truck, identifying an upcoming driving situation depending on the position of the industrial truck as well as depending on a driving job to be executed by the industrial truck, and setting a protective field monitored by the industrial truck based on the upcoming driving situation even before the industrial truck reaches the driving situation.

The at least one industrial truck can be for example an order picker. The at least one industrial truck can also be a tow car of a tugger train, wherein the tow car has one or more trailers. The method for controlling several industrial trucks is particularly suitable for controlling several industrial trucks in a joint warehouse or production hall. In that the position of the at least one industrial truck is determined within the route to be driven based on the driving job, it can be determined which driving situation the industrial truck will encounter next. Such a driving situation can be any situation requiring a change in the operating state of the industrial truck, for example driving in a curve or driving at an increased speed. In an embodiment, the protective field of the industrial truck is set according to the upcoming driving situation. Setting hereby means that for example the size and/or the position of an already existing protective field is changed and/or that a not yet existing protective field is generated. The protective field can be generated in particular by a collision protection apparatus of the industrial truck, wherein one or more sensors can be set for generating the changed or the generated protective field. As initially explained, the industrial truck is stopped or respectively slowed upon entry of an unknown object, for example a person or an object, into the protective field in order to prevent collisions. In an embodiment, a predictive positioning of the protective field takes place even before the industrial truck enters the respective driving situation. The protective field is not, as initially explained, first adjusted through a change in the driving situation of the industrial truck, i.e. for example through a steering angle, but rather even before encountering this situation. Safety is hereby increased since collisions can be more reliably avoided. Such predictive driving also enables in particular the operation of the industrial truck at higher speeds. Thus, for example, a curve can be negotiated at a higher speed. The turnover quantity can thus be increased and a particularly high safety for people, the industrial truck and loading can be guaranteed simultaneously. The driving job can hereby be transmitted to the industrial truck in particular by a superordinate control apparatus and saved in a vehicle controller if applicable.

In an embodiment, the position of the industrial truck is determined by means of a superordinate control unit, the upcoming driving situation is determined by the superordinate control unit, and a control command for setting the protective field is sent to the industrial truck by the superordinate control unit. The superordinate control unit is designed independently of the industrial truck; for example, it can be a warehouse management system. In an embodiment, the superordinate control unit is a server. The superordinate control unit is thereby designed to determine the position of the industrial truck within the driving job, that is within the route to be driven based on the driving job. The industrial truck can for example send its current position to the control unit. The current position of the industrial truck can also be known to the superordinate control unit based on the current driving job of the industrial truck. The previously known route to be driven by the industrial truck can be saved as part of the current driving job in the superordinate control unit and/or in the industrial truck. This driving job can be sent to the at least one industrial truck in particular by the superordinate control unit. According to this design, a coordination of the method thus takes place by the superordinate control unit. The control unit, for example the warehouse management system, can thereby coordinate in particular several industrial trucks, which move autonomously or are also controlled manually.

According to a further embodiment, the at least one industrial truck is an automatically or autonomously driving industrial truck. The industrial truck is hereby controlled entirely by a superordinate control unit, for example a central warehouse management system. With respect to the previous design, it is not (just) the method according to the invention which is then coordinated by the superordinate control unit, but rather the industrial truck is operated without a driver based on the control commands transmitted by the superordinate control unit. A predictive setting of the protective fields according to the invention is hereby of particular importance since a driver cannot act in an emergency.

In an embodiment, the upcoming driving situation is driving in a curve wherein the protective field is already positioned before the industrial truck starts driving in a curve in the direction of the curve. As already mentioned above, the upcoming driving situation can be driving in a curve. In contrast to the initially described systems, a situation-adequate positioning of the protective field does not first take place with the steering angle of the industrial truck but rather already before the industrial truck starts driving in a curve, for example while driving in a straight line before that. A positioning of the protective field can hereby take place for example such that a protective field is activated laterally of the industrial truck in the direction of the curve in the driving direction. This lateral protective field can thereby be switched in particular in addition to a protective field extending in the driving direction in front of the industrial truck. It can also be provided that a protective field extending in the driving direction in front of the industrial truck is shifted or deflected in the direction of the curve to be driven based on the upcoming start of driving in a curve.

According to a further embodiment, the upcoming driving situation is driving at an increased speed, wherein the protective field already covers a larger area in front of the industrial truck before the industrial truck starts driving at an increased speed or is shifted forwards in the driving direction. As also mentioned above, the driving situation can be driving at an increased speed. However, in contrast to the known systems, the speed of the industrial truck is not measured for example via an encoder provided on a wheel of the industrial truck and the protective field is not positioned based on this. According to the invention, the setting of the protective field instead already takes place predictively before an acceleration of the industrial truck. The protective field is thereby expanded depending on the speed specification for the upcoming route section of the previously known route so that it reaches further in front of the industrial truck. The protective field can also be shifted further forward in the driving direction of the industrial truck wherein the size of the protective field can also hereby change. This results in an obstacle, for example a person or an object, already entering the protective field early on and the industrial truck thus being able to start a braking action early on.

According to an embodiment, the monitored protective field is also further monitored after the respective driving situation has been left. As a result, not only a predictive setting of the protective field can be provided, but also a retrospective setting. Thus, for example after the industrial truck has driven in a curve, the protective field for the curve can remain activated for a certain period of time even if the industrial truck is driving in a straight line again at least in sections. This makes sense in particular if the industrial truck is a tow car of a tugger train, wherein the tow car has at least one trailer. According to an embodiment, the monitored protective field then continues to be monitored even after the respective driving situation is left until the at least one trailer has also left the respective driving situation. It can thus be taken into consideration that in particular in the case of tugger trains the tow car often drives in a straight line again after driving in a curve, while the trailer(s) are still in the curve. In particular if the following trailers cut the negotiated curve, higher collision safety can be achieved.

According to a further embodiment, the steering angle adopted by the industrial truck is monitored and the industrial truck is stopped if the steering angle exceeds a maximum angle specified by the driving job. For this, a sensor unit, for example an angle encoder, for determining the adopted steering angle can be provided on the industrial truck. The specified maximum value for the steering angle can be transmitted to the industrial truck as part of the driving job in particular by a superordinate control apparatus. The driving job can be saved in a vehicle controller. The superordinate control unit or the vehicle controller of the industrial truck synchronizes the current steering angle with the specified maximum angle. If the steering angle adopted by the industrial truck exceeds the maximum value, then the industrial truck is stopped by the collision protection apparatus. Thus, the industrial truck can be prevented from causing a collision while adopting a steering angle that is too great—for example due to an error.

According to an embodiment, the steering direction adopted by the industrial truck is monitored and the industrial truck is stopped if the steering direction deviates from a steering direction specified by the driving job. A sensor unit, for example an encoder can also be provided here accordingly for monitoring the adopted steering direction. As mentioned above, this sensor can also serve in particular to monitor the adopted steering angle. The specified steering direction results from the driving job, which can be transmitted in particular to the industrial truck by a superordinate control apparatus. As explained, the driving job can be saved in a vehicle controller. The superordinate control unit or the vehicle controller of the industrial truck synchronizes the adopted steering direction with the specified steering direction. If the adopted steering direction differs from the specified steering direction, the industrial truck is stopped. A collision can thus also be avoided in the case of an erroneous steering in a non-provided direction, for example to the right instead of to the left.

According to a further embodiment, the speed assumed by the industrial truck is monitored and the industrial truck is stopped if the speed deviates from a maximum speed specified by the driving job. The speed can be determined for example via an encoder provided on one of the wheels. The specified maximum speed results from the driving job, which can be transmitted in particular to the industrial truck by a superordinate control apparatus. As explained, the driving job can be saved in a vehicle controller. The superordinate control unit or the vehicle controller of the industrial truck synchronizes the current speed with the maximum speed, wherein the industrial truck is stopped if a maximum speed is exceeded and the collision safety is thus increased.

According to a further embodiment, the steering angle adopted by the industrial truck is monitored and the protective field of the industrial truck while driving in a curve is positioned depending on a discrete steering angle. The protective field for the driving in a curve is thus set depending on the steering angle. However, this does not take place continuously but rather discretely. As a result, the protective field can be adjusted in several stages with an increasing steering angle. For example, three discrete steering angles can be provided at 30°, 60° and 90°, wherein, at a steering angle of 30°, the protective field is set to a first position; at a steering angle of 60°, the protective field is set to a second position; and at a steering angle of 90°, the protective field is set to a third position. For each of the steering angle areas, a synchronization with a specified—for example by the driving job—steering angle can take place and, in the event of a deviation, the industrial truck can be stopped.

An embodiment of a system according to the invention comprises a superordinate control unit as well as at least one industrial truck, wherein the superordinate control unit is configured to determine the position of the industrial truck within a previously known route to be driven by the industrial truck. The superordinate control unit is also configured to identify an upcoming driving situation depending on the position of the industrial truck as well as depending on a driving job to be performed by the industrial truck as well as a protective field monitored by the industrial truck based on the upcoming driving situation even before the industrial truck reaches the driving situation.

The system according to the invention is suitable for performing the method according to the invention. The above explanations about the method apply correspondingly for the system. In particular, according to one design, the at least one industrial truck is an autonomously driving industrial truck.

BRIEF DESCRIPTION OF THE DRAWINGS

One exemplary embodiment of the invention is explained below using figures. In the figures:

FIG. 2 illustrates a top view of the industrial truck from FIG. 1 in positions 2a-2e while driving in a curve.

If not otherwise specified, the same reference numbers indicate the same objects below.

DETAILED DESCRIPTION OF THE INVENTION

Figure 1:
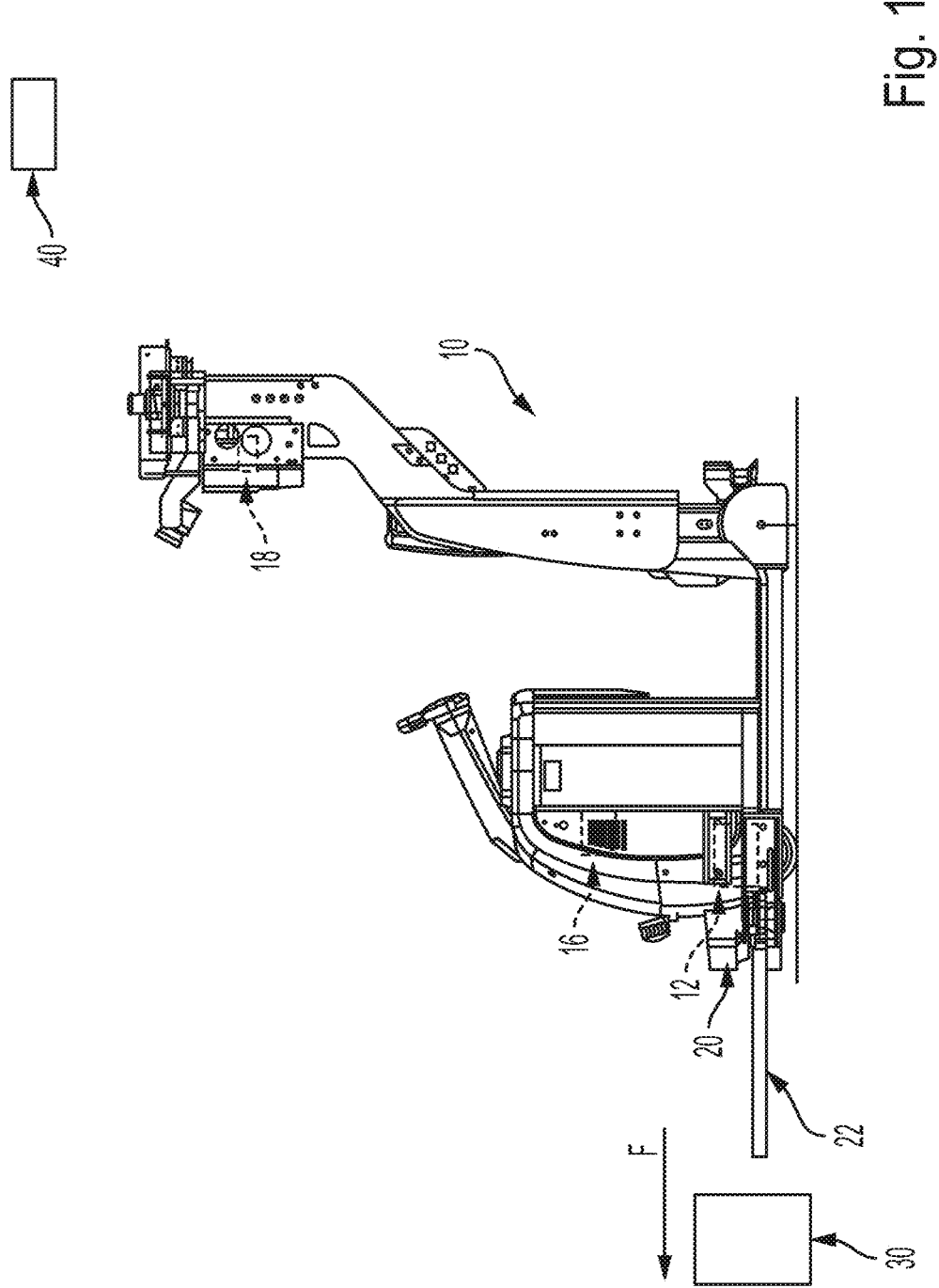
FIG. 1 illustrates a side view of an embodiment of an industrial truck.

FIG. 1 shows an industrial truck 10 which has a drive part 12. The industrial truck 10 is configured as a truck without a load part. The industrial truck 10 also has a schematically shown vehicle controller 16, a schematically shown transceiver 18 as well as a collision protection apparatus 20. The collision protection apparatus 20 serves to generate protective fields 22, 24 (FIG. 2 at steps 2b-2d) in the vicinity of the industrial truck for the purpose of monitoring the vicinity for obstacles, as will be explained in greater detail below. The industrial truck 10 is in contact with a schematically shown, superordinate control unit 40 via the transceiver 18. The superordinate control unit 40 can be for example a central warehouse management system. An obstacle 30, which lies in a driving direction F in front of the industrial truck 10, can also be seen in FIG. 1. If the industrial truck 10 approaches the obstacle 30, it enters the first protective field 22 lying in front of the industrial truck, whereupon the vehicle controller 16 initiates a braking action of the industrial truck.

The superordinate control unit 40 sends a driving job to the industrial truck 10, which receives it via the transceiver 18 and forwards it to the vehicle controller 16. The vehicle controller 16 controls the industrial truck 10 through a warehouse or production hall based on the driving job. The industrial truck 10 hereby negotiates several consecutive driving situations. The industrial truck 10 sends its position within the driving job, i.e. within the route to be driven based on the driving job, to the superordinate control unit 40 at regular intervals. The superordinate control unit 40 determines based on the driving job as well as the current position of the industrial truck 10 the next upcoming driving situation and sends the industrial truck 10 a control command for setting the protective field generated by the collision protection apparatus 20.

The method according to the invention is explained in detail below based on FIG. 2. Two protective fields 22 and 24 can be seen in positions 2b-2d of FIG. 2. Referring to position 2a of FIG. 2, the industrial truck 10 is driving in a straight line and only a first protective field 22 arranged in front of the industrial truck is activated. Referring to position 2b, the industrial truck 10 is approaching a left turn but is still driving in a straight line. The now upcoming driving situation consequently involves driving in a curve. The superordinate control unit 40 now sends the industrial truck 10 the command to activate the protective field for driving in a curve. The second protective field 24 is thus activated on the left side of the industrial truck 10 in the driving direction and thus monitors the following curve to be negotiated. Moreover, the first protective field 22 is enlarged in the present exemplary embodiment. Referring to position 2c, the industrial truck 10 now drives around a 90° left curve with the activated protective fields 22, 24. Referring to position 2d, the industrial truck 10 has already reached a straight line of travel again, wherein the second or lateral protective field 24 continues to remain active. The curve area can thus continue to be monitored, which makes sense in particular in the case of the presence of trailers following behind the industrial truck, which can still be driving in a curve at this point in time. Finally, at position 2e, the industrial truck is driving in a straight line at a sufficient distance from the negotiated curve, whereupon the lateral protective field 24 is deactivated. Moreover, the first protective field 22 is also reduced again here. The first protective field 22 can be enlarged in particular in that it is pushed forward in the driving direction. For example, a protective field sensor of the collision protection apparatus can be tipped for this, wherein the angle α shown in FIG. 1 is then reduced.

With the method or respectively the system according to the invention, a predictive activation or respectively adjustment of the protective fields is achieved, which leads to a particularly high collision safety as well as negotiating curves at higher speeds.

REFERENCE LIST

10 Industrial truck
12 Drive part
16 Vehicle controller
18 Transceiver
20 Collision protection apparatus
22 First protective field
24 Second protective field
30 Obstacle
40 Superordinate control unit

The invention claimed is:

1. A method for autonomously controlling at least one industrial truck, the method comprising:
  determining a driving job for the at least one industrial truck using a superordinate control unit positioned away from the at least one industrial truck, wherein the driving job comprises a curved driving route and an operating state;

transmitting the driving job from the superordinate control unit to a transceiver of the at least one industrial truck; and transmitting a command from the superordinate control to the transceiver of the at least one industrial truck configured to generate a protective field for driving the at least one industrial truck along the curved driving route;

generating the protective field for driving the at least one industrial truck along the curved driving route, wherein, when the curved driving route comprises a left curve driving route, the protective field is generated relative to the at least one industrial truck to monitor a left side and in front of the at least one industrial truck prior to entering the left curved driving route, and when the curved driving route comprises a right curve driving route, the protective field is generated relative to the at least one industrial truck to monitor a right side and in front of the at least one industrial truck prior to entering the right curved driving route;

driving the at least one industrial truck in the operating state along the curved driving route;

transmitting a position of the at least one industrial truck within the curved driving route at a time point to the superordinate control unit;

using the position of the at least one industrial truck within the curved driving route at the time point transmitted to the superordinate control unit to identify an upcoming portion of the curved driving route requiring a change in the protective field;

calculating an adjustment of a position of the protective field;

transmitting the adjustment of the position of the protective field to be monitored from the superordinate control to the transceiver of the at least one industrial truck before the at least one industrial truck reaches the upcoming portion of the driving route; and changing the position of the protective field based on the transmitted adjustment of the position of the protective field before the at least one industrial truck reaches the upcoming driving portion.

2. The method according to claim 1, wherein the upcoming portion of the curved driving route comprises a change in the operating state, wherein the change in the operating state comprises an increased speed, and wherein the protective field is expanded to cover a larger area in front of the at least one industrial truck before the industrial truck starts driving at an increased speed.

3. The method according to claim 2, wherein the change in the operating state further comprises a steering angle to be adopted by the at least one industrial truck, and wherein the at least one industrial truck is stopped if the adopted steering angle exceeds a maximum angle specified by the driving job.

4. The method according to claim 3, wherein the protective field is positioned depending on the steering angle.

5. The method according to claim 1, wherein the adjusted position of the protective field continues to be monitored after the upcoming portion of the curved driving route has passed.

6. The method according to claim 1, wherein the at least one industrial truck is a tow car of a tugger train comprising at least one trailer, and wherein the adjusted position of the protective field continues to be monitored even after the tow car leaves the upcoming portion of the curved driving route until the at least one trailer has also left the upcoming portion of the curved driving route.

7. The method according to claim 1, further comprising monitoring a steering direction adopted by the at least one industrial truck, wherein the at least one industrial truck is stopped if the monitored steering direction deviates from a steering direction specified by the driving job.

8. The method according to claim 1, further comprising monitoring a speed adopted by the at least one industrial truck, wherein the at least one industrial truck is stopped if the monitored adopted speed exceeds a maximum speed specified by the driving job.

9. The method according to claim 1, wherein the superordinate control unit is a server.

10. A system for autonomously controlling at least one industrial truck comprising:

a transceiver positioned on the at least one industrial truck;

at least one sensor;

a superordinate control unit positioned away from the at least one industrial truck and configured to, determine a driving job for the at least one industrial truck, wherein the driving job comprises a curved driving route and an operating state, transmit the driving job to the transceiver of the at least one industrial truck, transmit a command to the transceiver of the at least one industrial truck configured to generate a protective field for driving the at least one industrial truck along the curved driving route, generate the protective field positioned relative to the at least one industrial truck according to the curved driving route and the operating state using the at least one sensor, drive the at least one industrial truck in the operating state along the curved driving route, determine a position of the at least one industrial truck within the driving job to be performed by the at least one industrial truck, use the position to identify an upcoming portion of the curved driving route requiring a change in the operating state, determine an adjustment of a position of the protective field based on the upcoming portion of the curved driving route, and transmit the adjustment of the position of the protective field to the transceiver of the at least one industrial truck;

wherein the transceiver is configured to receive the adjustment of the protective field and adjust the position of the protective field monitored by the at least one industrial truck based on the upcoming driving portion before the at least one industrial truck reaches the upcoming driving portion; and a vehicle control system configured to change the operating state after the protective field is adjusted.

11. The system according to claim 10, wherein the at least one industrial truck is an autonomously driving industrial truck.

12. The system according to claim 10, wherein the superordinate control unit is a server.

* * * * *